UNITED STATES PATENT OFFICE.

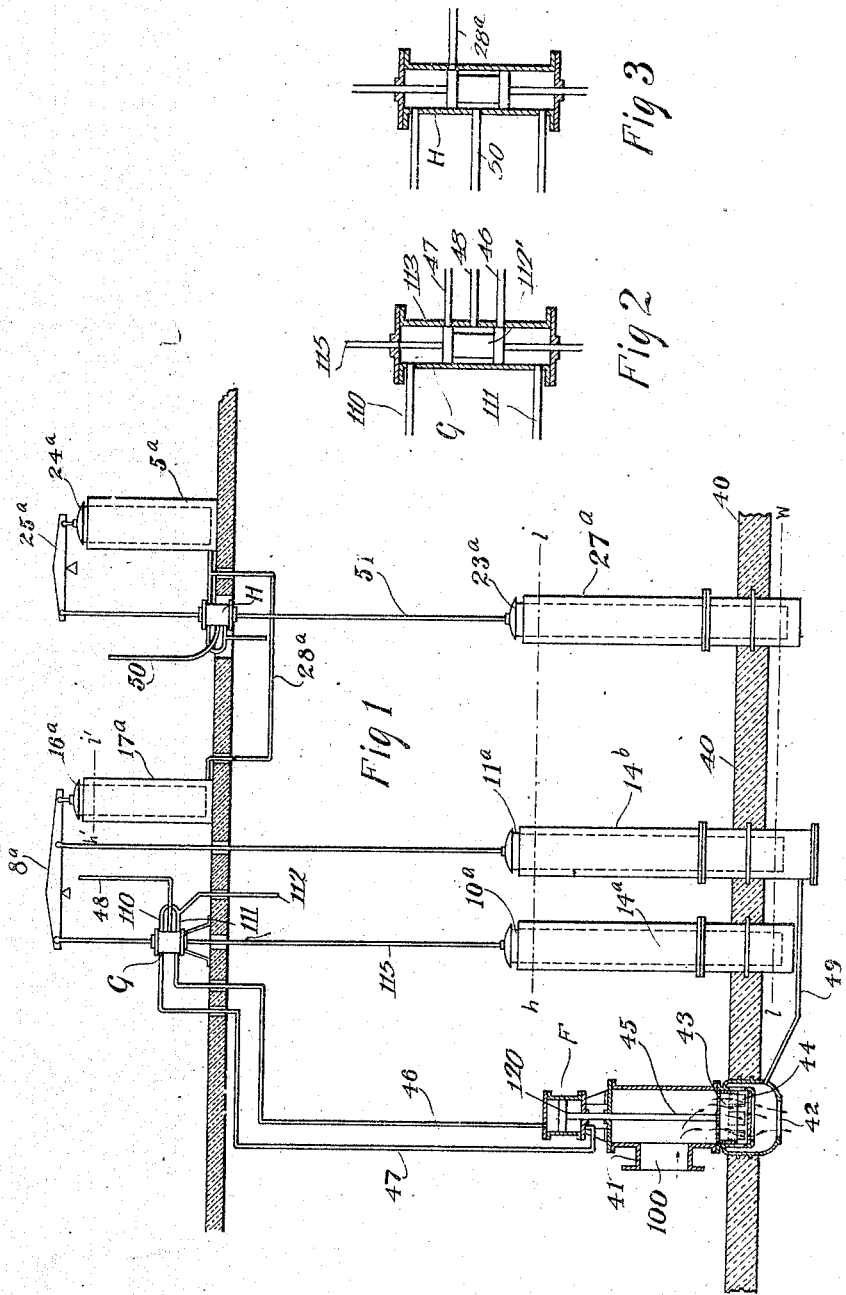

GEORGE GOODELL EARL, OF NEW ORLEANS, LOUISIANA.

FLUID-CONTROLLING DEVICE.

1,174,242.   Specification of Letters Patent.   Patented Mar. 7, 1916.

Original application filed January 3, 1910, Serial No. 536,239. Divided and this application filed November 11, 1912. Serial No. 730,670.

*To all whom it may concern:*

Be it known that I, GEORGE G. EARL, a citizen of the United States, residing at New Orleans, in the parish of Orleans and State of Louisiana, have invented certain new and useful Improvements in Fluid-Controlling Devices; and I do hereby declare the following to be a full, clear, and exact description of the invention, such as will enable those skilled in the art to which it appertains to make and use the same.

This invention relates to devices, or apparatuses that are employed for automatically controlling, or actuating an independent mechanism, such, for example, as a valve or set of valves for governing the head, or level of a liquid.

The main object of my invention is providing apparatus of the character described, that is of simple construction and which will correctly control the device of the mechanism which it is desired to operate automatically.

Other objects of my invention and the invention itself will be best understood by referring to the particular embodiment illustrated in the drawing, while the scope of invention will be best understood by referring to the appended claims.

This application is a division of my application #536239, filed January 3d, 1910.

Figure 1 is a diagrammatic view of an embodiment of my invention. Fig. 2 is a section of the valve G, and Fig. 3 a section of the form of valve shown at H.

The apparatus comprises a valve casing 41, which is suitably connected to the effluent pipe of a source of fluid pressure which may lead through a filter, not shown, but which is connected to said casing through an orifice 100. The valve casing is provided, preferably at its lower end with a discharge orifice 42, through which water passes into a fluid receptacle one of whose walls is shown at 40. The orifice 42 constitutes an outlet of adequate high and low pressure range. The effluent duct leading into the valve casing 41 constitutes a passageway from the source at the head of the effluent pipe to the orifice 42. A valve, preferably a slide valve 43, is arranged in the valve casing 41 for controlling the flow of water through a number of ports 44, which are arranged between the inlet opening of the valve casing and the discharge orifice. In the embodiment of the invention here shown, the stem 45 of the valve 43 is operated by a hydraulic piston "F" and a balanced pilot valve "G" is provided for controlling the flow of the hydraulic medium through pipes 46 and 47 to and from the cylinder of the hydraulic piston "F." This pilot valve "G" is illustrated in section in Fig. 2. The valve proper 112' is connected in some suitable way to the rod 115 and moves therewith. The duct 48 is connected to a pressure source and when the ducts 48 and 47 or 48 and 46 are connected together through the valve, the water will flow through the ducts 47 or 46 to the piston 120 and operate the valve 43. The waste pipes are shown at 110 and 111.

It will be obvious that various other means than the device above referred to, could be employed for operating the valve 43.

The mechanism for actuating the piston of the pilot valve "G," so as to govern the supply of water from the pressure line 48, consists of a movable member, such as a beam $8^a$ mounted on a fixed fulcrum and provided with other movable members, such as weights $10^a$, $11^a$, and $16^a$, which may be of any suitable specific gravity, material and size. The weight $16^a$ is approximately one-half the length and area of weights $10^a$ and $11^a$. The weight $10^a$ is arranged in such a way that pressure from the receptacle 40 may be conveyed thereto. In the embodiment shown, this is arranged inside of a tube, tank or cell $14^a$ whose lower end is open and communicates with the said receptacle 40. The water in the conduit 40 can thus rise in the tube $14^a$. Means are likewise provided for conveying pressure of the fluid on the pressure side of the orifice 42 to the other movable member $11^a$. In the form shown, this is accomplished by providing a tube, tank or cell $14^b$ in which the weight $11^a$ is suspended and connecting this tube, by means of a duct 49, to the valve casing 41, or other convenient source of such pressure. Here shown, it is connected with the casing 41 on the pressure side of the orifice 42.

Another movable member, such as a weight $24^a$ is arranged inside of a tank or cell $5^a$ and is suspended from a movable member, such as a beam, or lever $25^a$, while another movable member, such as a weight $23^a$ is connected to the opposite end of the member $25^a$ and is suspended inside of a tube, tank or cell $27^a$ whose lower end is open and communicates with the conduit 40, so that the water in said conduit may rise in said tube. The tank 5ᵃ is connected to the lower end of a tank or cell 17ᵃ by a duct 28ᵃ, which serves to transmit pressure from the source of fluid pressure associated with the duct 50 to the cell 17ᵃ. The tank or cell 17ᵃ incloses a movable member, such as a weight 16ᵃ, which is connected to the beam 8ᵃ preferably on the same side of the fulcrum as the weight 11ᵃ. A balanced pilot valve "H" is provided for controlling the supply of water from a pressure line 50 into the tank 5ᵃ and the piston of said pilot valve is secured to rod 51 that forms a connection between the weight 23ᵃ and the beam 25ᵃ, so that said piston will be actuated whenever the equilibrium of the weights 23ᵃ, 24ᵃ, and the beam 25ᵃ is destroyed. In the form shown, the area of the weight 24ᵃ is twice that of the weight 23ᵃ and these weights are connected to the beam 25ᵃ in such a manner that they are in balance when the height of the water level above the bottom of the weight 24ᵃ is one-half of the height of the water level above the bottom of the weight 23ᵃ.

When the pressure of the water entering the controller, or valve casing 41 is high, as, for example, when the bed of the filter is cleaned, the slide valve 43 occupies such a position that only enough water will pass through the ports 44 to meet the requirements. As the filter gradually clogs, the head, or pressure of water entering the controller will, of course, become diminished. If the same flow from the filter is to be maintained, it is obvious that the valve 43 will have to be moved, so as to gradually open the ports 44 until they are completely open. This is one of the objects of this apparatus, namely, to gradually increase the port area, as the bed of the filter becomes clogged, so as to maintain practically a constant flow of water from the filter into the receptacle 40. The broken line $h$—$i$, in Fig. 1, represents the maximum water level in the reservoir and the broken line $i$—$w$, in Fig. 1 represents the minimum level. As previously stated, the lower ends of the tubes 14ᵃ and 27ᵃ are open, so that the water can rise therein and as the lower end of the tube 14ᵇ is connected by the pipe 49 to the pressure side of the discharge orifice 42, the water can also rise in said tube 14ᵇ, the apparatus being so designed that the filter is out of service when the water stands at the level $h$—$i$ in the tubes 14ᵃ, 14ᵇ and 27ᵃ and at $h'$—$i'$ in tube 17ᵃ. When the filter is in service the water entering the valve casing 41, passes out of same through the orifice 42 and any pressure between the ports 44 and the discharge orifice 42 will build up a head in the tube 14ᵇ.

The weights 10ᵃ, 11ᵃ and 16ᵃ are all weighted in excess of their displacement, when the water around the weights 10ᵃ, and 11ᵃ stands at the point indicated by the broken line $h$—$i$ and when the water around the weight 16ᵃ stands at the point indicated by the broken line $h'$—$i'$. For convenience in explaining the operation of the apparatus, we will assume that the weights 10ᵃ, 11ᵃ and 16ᵃ are in balance when the water level stands at this point around all three of said weights. It will be evident that if the level around the weight 16ᵃ is lowered one foot, that the weight of 16ᵃ will be increased by the amount of the decreased displacement and the beam 8ᵃ will therefore be unbalanced. The balance may be restored by increasing the level around 16ᵃ one foot, or by lowering the level around the weight 10ᵃ one foot. It will also be evident that if the level around 10ᵃ be one foot lower than the level around 11ᵃ that this also will correct the balance of the beam 8ᵃ. Therefore, if the level around the weight 16ᵃ be one foot below the line $h'$—$i'$, the beam will be in balance if the level around weight 10ᵃ is one foot lower than the level around the weight 11ᵃ, irrespective of where the levels around weights 10ᵃ and 11ᵃ may be as long as the distance between the levels is one foot. We will assume that it is desired to operate the filter on a one foot head over the submerged orifice 42. From what has been said, it is seen that the tubes 14ᵃ and 14ᵇ are connected with the water on the two sides of the orifice 42, so that the levels in these tubes must represent the pressure on the two sides of said orifice. If any motion of the beam 8ᵃ up or down will act through the pilot valve G, or any other suitable device to regulate the pressure on the pressure side of the orifice 42, increasing the pressure by opening the hydraulic valve and increasing the area of the ports 44 whenever the difference of level in tubes 14ᵃ and 14ᵇ is less than one foot, and closing the hydraulic valve and decreasing the area of said ports whenever the difference in levels in tubes 14ᵃ and 14ᵇ is more than one foot, we then have a constant pressure on the orifice 42, and therefore, a constant rate of discharge from the filter through said orifice.

To set the controller so as to maintain a one foot head over submerged orifice 42, 11ᵃ may be given a weight in excess of 10ᵃ equivalent to one foot of its displacement, or 16ᵃ may be given a weight proportionately as great. When so arranged the set will be in balance when the level around 10ᵃ is one foot below that around 11ᵃ. If the level around 16ᵃ remains at this point the rate of discharge from the orifice 42 will remain constant, so long as the level around 10ᵃ is one foot less than the level around 11ᵃ, and we thus have a constant rate controller, which will maintain a constant discharge from the filter under these conditions. By weighting 11ª or 16ª so as to maintain a greater or a less difference in level between 10ª and 11ª, the head over the orifice 42 may be increased or decreased as may be desired, and when so set the head desired over the orifice will be maintained and the rate of discharge will be proportionately altered by such changing of the weights. While the weights 10ª and 11ª would make a perfectly satisfactory controller in conjunction with the pilot valve G and the hydraulic valve F, nevertheless it is desired to use the weights 16ª, 23ª and 24ª for the purpose hereinafter described. It has previously been stated that the weights 10ª, 11ª and 16ª can be so arranged as to be in balance when the level of the water around 16ª is at $h'—i'$ and when the level around 10ª and 11ª is at $h—i$, and it will be evident from what has been previously stated that a fall of level around 16ª will be equivalent to an equal fall of level around 10ª. In view of the fact that the level of the reservoir with which the conduit 40 communicates varies in accordance with the consumption demands on said reservoir, it is desirable to provide some means for automatically increasing the rate of filtration, as the water in the reservoir begins to approach the minimum level, without permitting the rate of filtration to rise too high, and to decrease the rate of filtration automatically and gradually when the water in the reservoir approaches the maximum level and to automatically shut off the filter when the water in the reservoir reaches the maximum level. To accomplish this, I have provided apparatus with the weights 23ª, 24ª and 16ª. The beam 25ª is in balance when the water level in the tubes 27ª and 5ª stands approximately even with the bottom of the weights 23ª and 24ª, or when the level around 23ª is twice as far above the lower end of same as the level around 24ª is above the lower end of same. Thus, if the water rises four feet above the bottom of the weight 23ª a rise of two feet above the bottom of weight 24ª will restore the balance. Now if a slight motion of the beam 25ª up or down will tend to open the pilot valve H and cause the level around 16ª to fluctuate proportionately with that around 23ª, any rise in the tube 27ª which represents the level of the water in the reservoir, will be balanced by one-half as much of an increase of level around 24ª, and any fall of level around 23ª will be instrumental in causing a fall of level around 24ª of one-half as much. In view of the fact that any fluctuation of level in the tank 5ª must be communicated to the tank 17ª, in which the weight 16ª is arranged, it will be seen that any rise or fall of level around the weight 23ª must cause a corresponding rise or fall of level of one-half as much around weights 16ª and 24ª. Or, if the weights 16ª of each set be inclosed in a tube or tank, and all of such tanks be connected with the tank 5ª by an open pipe of proper size, then any fluctuations around weight 24ª will be communicated to each of said tubes and the weights therein. In view of the fact that a fall in level around weight 16ª means a corresponding difference of level between 10ª and 11ª, it can be readily seen that if the said 10ª, 11ª and 16ª are in balance only when the level stands at $h—i$ around weights 10ª and 11ª, and at $h'—i'$ around weight 16ª, that then the head over the orifice 42 will be zero when the level around said weights stands at the point mentioned and, therefore, the filter will be automatically closed. If now the level in the reservoir falls one foot below the maximum level $h—i$ around weight 23ª, this will cause a corresponding fall of level of one-half a foot around weight 16ª and thus increase the downward pull of weight 16ª and cause the valve G to open the controller until the level around 11ª is built up six inches higher than the level around 10ª. If a fall of level of two feet occurs around weights 10ª and 23ª this will occasion a one foot fall around weights 16ª and 24ª, which will in turn result in a difference in level of one foot being built up and maintained over the orifice 42. If the level in the reservoir stands, say two feet below the maximum level $h—i$ and then the level in the reservoir slowly rises until it stands only six inches below the maximum level, the level of the water around weights 16ª and 24ª will build up slowly in accordance with the rise around weights 10ª and 23ª and the head over the orifice 42 will be slightly reduced in accordance with the rise, until the point is reached where there will be a head of only three inches over the orifice 42. When the water rises to the maximum level $h—i$, it will also have risen to the levels $h'—i'$ around the weights 16ª and 24ª and the filter controller will be closed automatically and thus throw the filter out of service.

It will be obvious to those skilled in the art that numerous and extensive departures from the form and details of the embodiment of my invention here shown may be made without departing from the spirit of the invention. This embodiment being shown solely for the purpose of clearly illustrating one form of the invention.

Having thus illustrated and described a particular embodiment of my invention, what I desire to claim is:

1. In a device of the class described, the combination of a conduit having an orifice therein, a valve for regulating the flow of water through said orifice, a beam, a plurality of weights suspended therefrom, a tube in which one of said weights hangs, means to connect said tube with said conduit whereby water flows from said conduit into said tube and around said weight, a tube surrounding another of said weights and communicating with the pressure side of said orifice, means operated by said beam controlling the position of said valve, a tank containing liquid in which another of said weights is suspended, a second beam, a weight suspended from said second beam, a tube communicating with said conduit in which said last named weight is suspended, a coöperating weight suspended from said second beam, a tank communicating with said first named tank in which said coöperating weight is suspended and a valve operated by said second beam for governing the ingress and egress of a liquid to and from said tanks.

2. In a device of the class described, the combination of a fluid conduit, a vibratile member, means in line of said conduit to obtain a plurality of fluid pressures whose difference will be functional to the flow of fluid through said conduit, means to cause this pressure difference to act upon said vibratile member, means to create a varying pressure resultant, means to cause such resultant to act upon said vibratile member, means to hold said vibratile member in equilibrium when the required functional relations between said pressure difference and said pressure resultant exist, and means operated by said vibratile member to change said pressure difference functionally to changes occurring in said varying pressure resultant.

3. In a device of the class described, the combination of several fluid pressure cells, a source of varying fluid pressure connected with one of said cells, a second source of fluid pressure and an outlet for fluid flow of adequate high and low pressure range, a passage-way from said last named source to said outlet, means in said passage-way to create two fluid pressures whose difference is proportional to the flow therethrough, means to cause the last two named pressures to act in two other of said cells, a movable member affected by the pressures in all of said cells, and a valve in said passage-way operated by said movable member to regulate the flow through said passage-way.

4. In a device of the class described, the combination of several fluid pressure cells, a source of fluid pressure and means to connect said source with one of said cells and to transmit to said cell pressure from said source, a second source of fluid pressure, an outlet for fluid flow of adequate high and low pressure range, a passage-way from said second named source to said outlet, means in said passage-way to create different fluid pressures in said passage-way, one of each of said pressures thus created being transmitted to one each of the other of said cells, a valve controlling the flow of fluid through said passage-way, means including a movable member controlling said valve and apparatus for transmitting to said movable member the fluid pressures in all of said cells.

5. In a device of the class described, the combination of several fluid pressure cells, a source of pressure, means to transmit pressure from said source to one of said cells, a second source of pressure, an outlet for fluid flow of adequate high and low pressure range, a passage-way from said second source to said outlet, a restriction in said passage-way, means for transmitting to one of said cells the fluid pressure on one side of said restriction, means to communicate to the other of said cells the fluid pressure on the other side of said restriction, a valve controlling the flow of fluid in said passage-way, means including a movable member controlling said valve and mechanism for transmitting to said movable member the pressures in all of said cells.

6. In a device of the class described, the combination of several fluid pressure cells, a source of pressure, means to transmit pressure from said source to one of said cells, a second source of pressure, an outlet for fluid flow of adequate high and low pressure range, a passage-way from said second source to said outlet, an orifice in said passage-way, means for transmitting to one of said cells the fluid pressure on one side of said orifice, means to communicate to the other of said cells the fluid pressure on the other side of said orifice, a valve controlling the flow of fluid in said passage-way, means including a movable member controlling said valve and mechanism for transmitting to said movable member the pressures in all of said cells.

7. In a device of the class described, the combination of a source of fluid pressure, an outlet of adequate high and low pressure range, a passage-way from said source to said outlet, a valve controlling the flow of fluid in said passage-way, mechanism for operating said valve, means in said passage-way for creating a fluid pressure differing proportionally to the flow through the passage-way, means for transmitting to said mechanism the pressures thus created, a second source of fluid pressure and means for transmitting to said mechanism pressure from said second source.

8. As a means for maintaining the fluid flow in a conduit in a predetermined functional relation with a varying static fluid pressure, means to create two static fluid pressures in line of the flow in the conduit, whose difference is proportional thereto, several fluid pressure cells, means to cause said two pressures to act respectively in two of said cells, means to cause the varying static pressure to act in a third of said cells, a valve controlling the fluid flow through the conduit, a movable member controlling said valve and means to transmit to said movable member the pressures in said pressure cells.

9. As a means for maintaining the fluid flow in a conduit in a predetermined functional relation with a varying static fluid pressure, the combination of means to create a varying static fluid pressure, means to create two static fluid pressures in the line of the flow through the conduit, whose difference is proportional to such flow, a valve controlling the flow of fluid through the conduit, mechanism controlling said valve and means to transmit to said mechanism the varying static fluid pressure and the static fluid pressures in the conduit.

10. In a device of the class described, a plurality of fluid pressure cells, means to create a varying static fluid pressure connected with and acting in one of said cells, a source of fluid pressure and an outlet for fluid flow of adequate high and low pressure range, a passage-way from said source to said outlet and a connection from said passage-way to the other of said fluid pressure cells, a movable member connected to the static pressure in said cells and a valve in said passage-way operated by said movable member to regulate the flow therethrough to maintain a predetermined functional relation between the static pressure in the first cell and the static pressure in the other cell.

11. In a device of the class described, a plurality of fluid pressure cells, means to create a varying static fluid pressure connected with and acting in one of said cells, a source of fluid pressure and an outlet for fluid flow of adequate high and low pressure range, a passage-way from said source to said outlet and a connection from said passage-way to the other of said fluid pressure cells, a movable member connected to the static pressure in said cells and a valve in said passage-way operated by said movable member to regulate the flow therethrough to maintain a predetermined functional relation between the static pressure in the first cell and the static pressure in the other cell and apparatus actuated by the pressure in the last named cell.

12. In a device of the class described, the combination of a pair of fluid pressure cells, a source of pressure for creating a varying static fluid pressure, means for transmitting such pressure to one of said cells, a second source of fluid pressure, an outlet for fluid flow of adequate high and low pressure range, a passage-way from said second source to said outlet, a duct connecting said passage-way to the other of said cells, a valve in said passage-way controlling the flow of fluid therethrough, mechanism controlling said valve and means to transmit to said mechanism the fluid pressures in said cells.

13. In a device of the class described, the combination of a pair of fluid pressure cells, a source of pressure for creating a varying static fluid pressure, means for transmitting such pressure to one of said cells, a second source of fluid pressure, an outlet for fluid flow of adequate high and low pressure range, a passage-way from said second source to said outlet, a duct connecting said passage-way to the other of said cells, a valve in said passage-way controlling the flow of fluid therethrough, mechanism controlling said valve, means to transmit to said mechanism the fluid pressures in said cells, and apparatus actuated by the pressure in one of said cells.

14. In a device of the class described, the combination of a main source of fluid pressure, an outlet for fluid flow of adequate high and low pressure range, a main conduit connecting said source and said outlet through which fluid flows under pressure, a second source of fluid pressure, a duct communicating with said second source through which fluid flows from said source, mechanism for regulating the flow of fluid in the duct, said mechanism controlled by the fluid pressure in the main conduit, a valve in the main conduit controlling the flow of fluid therethrough and means controlled by the flow through said duct governing said valve.

15. In a device of the class described, the combination of two sources of fluid pressure, either of which is varying, the pressures at the sources being unequal, a passage-way adapted to discharge fluid from the higher to the lower of said two sources, means in said passage-way to cause two pressures to exist whose difference is proportional to the flow therethrough, a valve in said passage-way on one side of said means and means to operate said valve including a movable system acted upon by one of the two said unequal sources of pressure and by the said two pressures whose difference is proportional to the flow through said passage-way.

16. In a device of the class described, the combination of two sources of fluid pressure, the pressures at said sources being unequal, a passage-way adapted to discharge fluid from the higher to the lower of said sources, means in said passageway to create a pressure difference proportional to the flow of fluid through the passage, a valve controlling the flow through the passage-way, mechanism for operating said valve including a movable member, and apparatus for transmitting to said movable member the pressures created in said passage-way and the pressure from one of said sources.

17. In a device of the class described, the combination of two sources of fluid pressure, the fluid pressures at said sources being unequal, a passage-way adapted to discharge fluid from the higher to the lower of said sources, an orifice in said passage-way to cause a pressure difference on the two sides thereof, a valve controlling the flow through the passage-way, mechanism for operating said valve and apparatus for transmitting to said mechanism pressure from one of said first named sources and pressures from each side of said orifice.

In testimony whereof, I affix my signature in the presence of two witnesses.

GEORGE GOODELL EARL.

Witnesses:
EDWARD A. MOWEN,
JOHN C. BARTLEY.